March 29, 1966   D. C. STAAB ET AL   3,243,025
CONTROL VALVE FOR HYDRAULICALLY ACTUATED CLUTCHES
Filed March 12, 1964   3 Sheets-Sheet 1
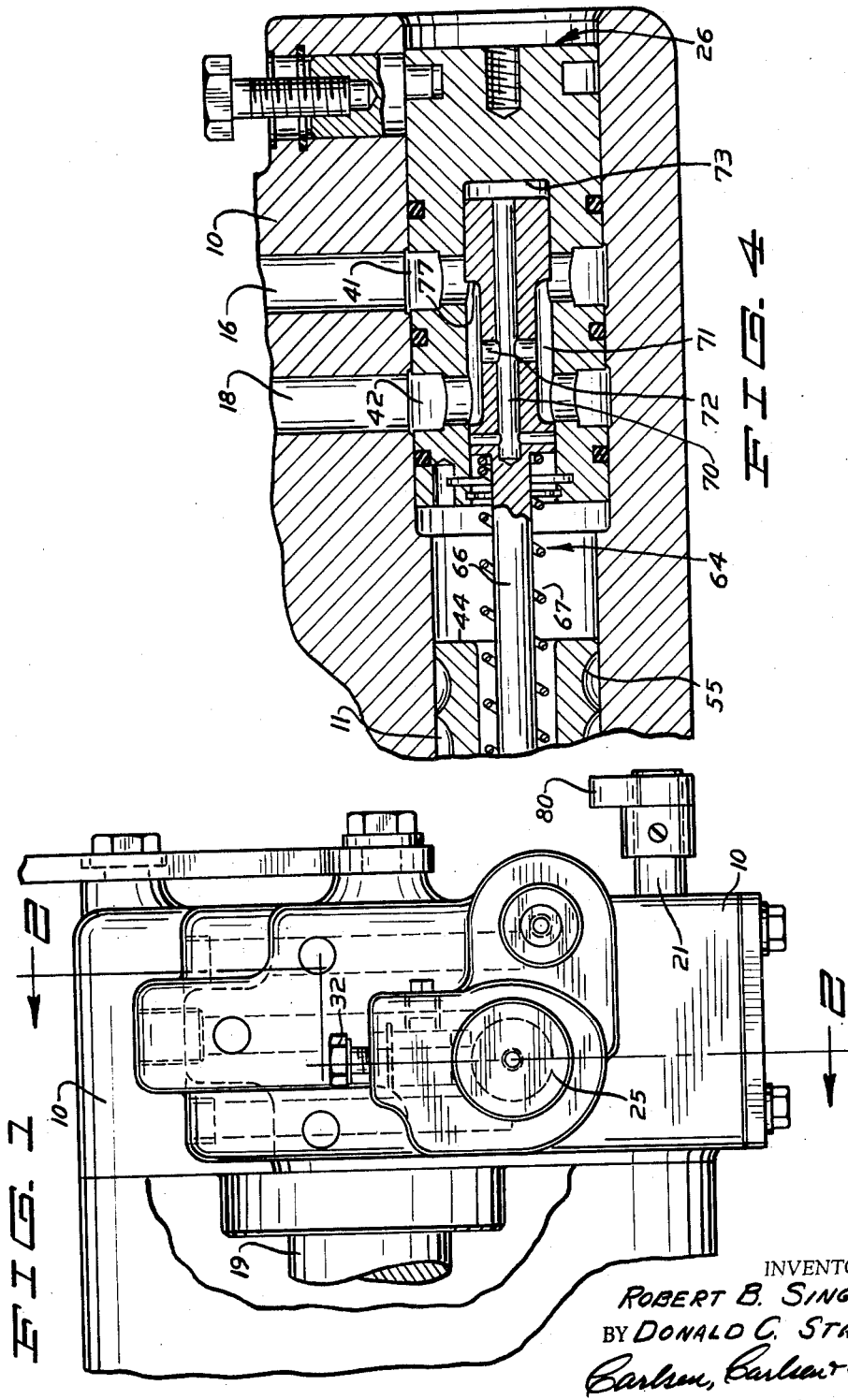
INVENTORS
ROBERT B. SINGER
BY DONALD C. STAAB
ATTORNEYS

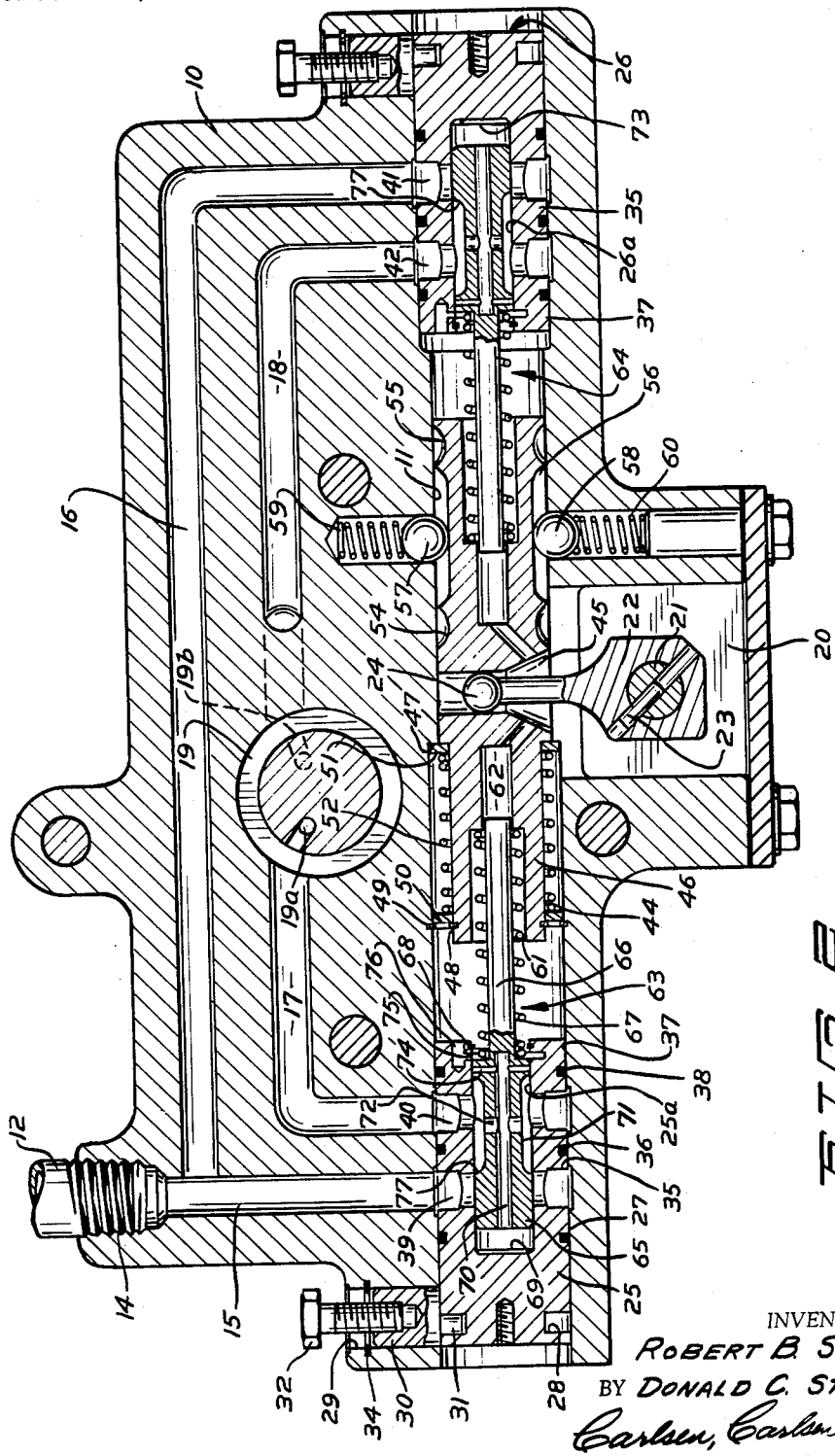

INVENTORS
ROBERT B. SINGER
BY DONALD C. STAAB
Carlsen, Carlsen & Sturm
ATTORNEYS

United States Patent Office 3,243,025
Patented Mar. 29, 1966

3,243,025
CONTROL VALVE FOR HYDRAULICALLY ACTUATED CLUTCHES
Donald C. Staab, Cedar Rapids, Iowa, and Robert B. Singer, Minneapolis, Minn., assignors to Minneapolis-Moline, Inc., Hopkins, Minn., a corporation of Minnesota
Filed Mar. 12, 1964, Ser. No. 351,415
7 Claims. (Cl. 192—87)

This invention relates generally to valving for controlling hydraulic fluid flow and more particularly concerns a valve mechanism for operating the forward and reverse clutches of a vehicle to selectively place the vehicle engine in driving engagement with the vehicle wheels.

Industrial lift trucks are commonly provided with a single engine which provides both the motive power for the vehicle and the power for manipulating the fork or carriage on the mast. It is frequently desirable to "inch" the vehicle slowly in forward or reverse directions while maintaining constant power from the engine to fork control means. Accordingly, hydraulically operated forward and reverse slip clutches are provided in the power train from the engine to the drive wheels. The present invention concerns a valve for selectively controlling the hydraulic pressure to such clutches to allow controlled clutch slippage where forward or reverse inching movement of the vehicle is desired.

The primary object of the invention is to provide a manually operable clutch control valve for controlling both forward and reverse clutches of a vehicle which facilitates immediate response of the clutches to manual actuation enabling maximum and immediate control of the vehicle by the operator.

Another object of the invention is to provide a clutch control valve of the type described which maintains the clutches in a hydraulically precharged condition to facilitate prompt response of the clutches to valve actuation without clutch refill delay or hydraulic system lag.

Still another object of the invention is to provide a control valve of the type described which assures an extremely smooth vehicle inching operation with pressure feed back to the manual control to give the operator the necessary "feel" of the control inching position, as distinguished from neutral or constant drive positions.

Still another object of the invention is to provide a control valve of the character described wherein the precharging of the clutches and the pressure loading thereof responsive to preselected movement of the manual control can be adjusted by an external positioning device to vary the tension of spring components within the valve.

With these and other objects in mind, the invention broadly comprises a valve housing having an elongated valve chamber open to a source of fluid under pressure and through separate passages to the forward and reverse clutch packs of a vehicle transmission, a valve spool disposed for sliding movement in the chamber operation of a connected manual control, spring means acting between the housing and spool to yieldably hold the latter in a neutral position, a pair of valve plungers slidably associated one with each end of the spool for opening and closing said passages as the spool is moved, there being counteracting spring and hydraulic pressure means acting endwise upon each plunger to determine the plunger position relative to the spool, means for adjusting the hydraulic pressure means, and passage means in each plunger permitting minimal fluid passage from the source to the clutch packs when the spool is in neutral position to provide a hydraulic precharge to the clutch packs.

The above mentioned and additional objects of the invention will be brought to light during the course of the following specification, reference being made to the accompanying drawings, in which:

FIG. 1 is an end elevation of the valve showing the transmission shaft extending into the housing.

FIG. 2 is a longitudinal vertical section through the valve taken on line 2—2 of FIG. 1 and looking in the direction of the arrows. In this view the valve is shown in neutral condition.

FIG. 3 is similar to FIG. 2 but with the valve spool moved forward to open the forward clutch to fluid pressure.

FIG. 4 is an enlarged fragmentary section of the front portion of the valve in the condition shown in FIG. 3.

Figure 9:
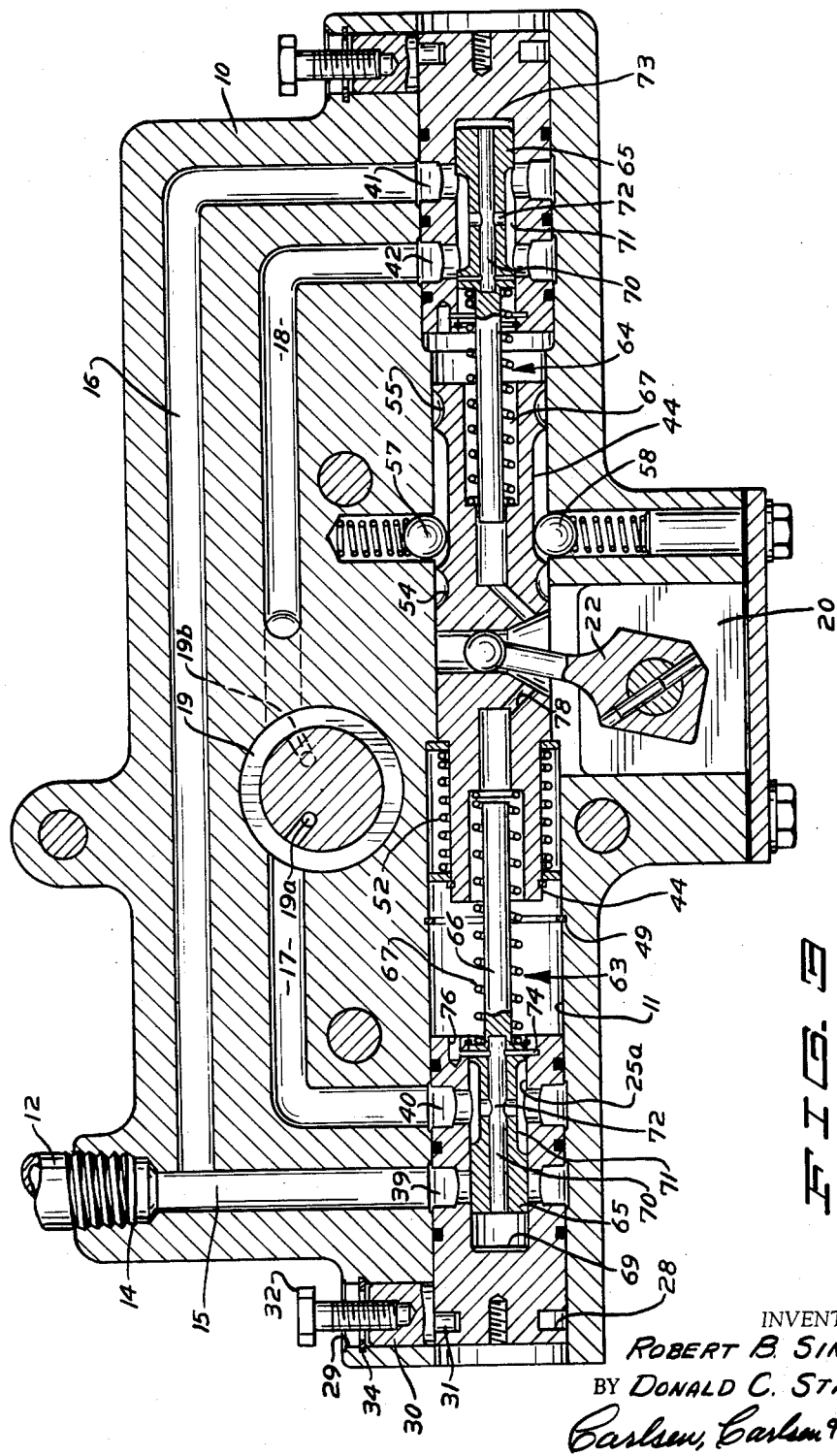

Referring now more particularly to the drawings, reference characters will be used to denote like parts and structural features in the different views. The numeral 10 denotes generally the valve housing which has an elongated cylindrical valve chamber 11 extending longitudinally therethrough. A fluid inlet line 12 extends from a pumping station of a source of hydraulic fluid to the upper portion of the housing for carrying fluid under pressure to the valve chamber 11 through an inlet passageway 14 and reverse clutch inlet passageway 15 in the housing. A forward clutch inlet passageway 16 leads from passageway 15 through the housing to the opposite end portion of chamber 11. It will accordingly be understood that passageways 15 and 16 are constantly filled with fluid under pressure from the line 12.

Reverse and forward clutch outlet passageways denoted respectively at 17 and 18 lead from the chamber 11 near the respective inlet passageways 15 and 16 to a transmission shaft 19 having one end journaled for rotation in the housing. Shaft 19 has two axially spaced grooves which respectively provide closed communication between reverse clutch outlet passageway 17 and transmission shaft reverse clutch passage 19ª, and forward clutch outlet passage 18 and transmission shaft forward clutch passage 19ᵇ. Passages 19ª and 19ᵇ extend axially through the shaft 19 respectively to the reverse and forward clutches of the transmission, it being understood that as fluid under pressure is admitted to passage 19ª the reverse clutch will be engaged for reverse movement of the vehicle and as fluid under pressure is admitted to passage 19ᵇ the forward clutch will be engaged for forward movement of the vehicle.

The housing 10 has a longitudinally centered control chamber 20 communicating with the valve chamber 11. A control shaft 21 is journaled in the housing to extend transversely through chamber 20 and has a valve control element 22 mounted thereon as by pin 23. Control element 22 extends upwardly into the chamber 11 and has a spherical actuating head 24 at its upper end.

The ends of the valve chamber 11 are closed by cylindrical plugs or spools denoted generally at 25 and 26. Inasmuch as these plugs are identical, only the reverse end plug 25 will be discussed in detail. The plug has a peripheral groove fitted with an O-ring 27 to provide a fluid seal. Another large peripheral groove 28 is provided near the outer end of the plug. Immediately above the groove 28 a screw chamber 29 is provided in the housing 10. This chamber has a cam plug disposed therein with said plug having an eccentric finger 31 projecting downwardly into the groove 28. The cam plug 30 has an adjustment bolt 32 threaded axially therein and the plug is retained against upward removal from chamber 29 by means of a snap ring 34. It will be understood that by turning bolt 32, the plug 30 and its eccentric finger will be caused to rotate adjusting the closure plug 25 inwardly or outwardly in the valve chamber 11 as desired. The forward end plug 26 can be adjusted in the same manner.

The inner end portions of the spools 25 and 26 are formed to provide spaced outer and inner valve rings denoted at 35 and 37 respectively. These ring portions have peripheral grooves for the seating of O-rings 36 and 38. The spools 25 and 26 are axially tapped to provide inwardly opening cylindrical piston cavities denoted generally at 25ª and 26ª and each spool is provided with ports for opening such cavities to the housing inlet and outlet passageways in the housing 10. Spool 25 has a reverse clutch inlet port 39 aligned with the inlet passageway 15 and a reverse clutch outlet port 40 aligned with the passageway 17. By the same token, the spool 26 has a forward clutch inlet port 41 aligned with the forward clutch inlet passageway 16 and a forward clutch outlet port 42 aligned with the outlet passageway 18.

The valve spool disposed in the longitudinal central portion of chambers 11 is designated generally by the numeral 44. This spool has a socket 45 extending crosswise through the center thereof for receiving the upper portion and head 24 of the control element 22. The spool fits within the chamber 11 for longitudinal sliding movement therein. The reverse end portion 46 of the spool 44 is reduced in diameter and the corresponding end portion of the chamber 11 is enlarged leaving a rearwardly facing annular shoulder 47 in the chamber wall. An inner snap ring 48 is mounted on the spool 44 near the end of portion 46. An outer snap ring 49 is mounted in the wall of chamber 11 to normally surround the ring 48. Axially spaced washers 50 and 51 loosely encircle the spool portion 46 and are yieldably held in such spaced relation by the coil spring 52 which encircles spool portion 46 and is held under compression between the washers.

It will accordingly be understood that spring 52 acts as a centering spring to yieldably hold the spool 44 in the longitudinally centered or neutral position in valve chamber 11 as shown in FIG. 2. When the spool is moved in a rearward direction, or to the left in FIG. 2, the spring will be compressed between washers 50 and 51 with the latter moving to the left and the former being held in place by the outer snap ring 49. When the spool is moved in a forward direction, or to the right in FIG. 2, the spring 52 will be compressed between the washers with the washer 50 being moved to the right by inner snap ring 48 and washer 51 being held in place by the shoulder 47. In either case the compressive force of the spring will tend to urge the valve spool back to the centered position shown in FIG. 2.

The forward end portion of the spool opposing the reduced portion 46 is provided with axially spaced peripheral grooves or detents 54 and 55 separated by central portion 56. A pair of locking balls 57 and 58 are disposed in diametrically opposing sockets in the housing 10 and respectively held against the portion 56 by retaining springs 59 and 60 disposed in the sockets. Accordingly, when the valve spool is moved axially a sufficient distance in either direction, the balls 57 and 58 may seat in detents 54 or 55 to lock the spool against return movement by the centering spring 52.

Each end of the valve spool 44 is provided with an axial bore 61 which is diametrically reduced at its inner end as at 62. A pair of valve plunger units 63 and 64 are disposed in telescopic relation one in each bore 61 of the spool. Inasmuch as these units are identical in construction, only the reverse clutch controlling plunger 63 will be described in detail.

The plunger has a piston head 65 which is slidably disposed in the cavity 25ª of the closure plug or spool 25. At its inner end the piston head 65 has an axially extending guide pin 66 which extends into the bore 61 and its reduced portion 62. A plunger spring 67 encircles the pin 66 and is held under slight compression between the plunger head 65 and the internal shoulder in the spool bore 61 at the opening of the reduced bore portion 62. A snap ring 68 is provided in the plug ring portion 37 to retain the head 65 against withdraw therefrom. A closed chamber 69 is formed at the closed end portion of the cavity 25ª between the cavity end wall and the end of the piston head 65. The corresponding chamber at the other end of the valve in cavity 26ª and beyond the piston head of the plunger unit 64 is denoted by numeral 73.

Each piston head 65 is provided with an axial passage 70 drilled from the outer end thereof. The central portion of head 65 is peripherally recessed to provide a clutch control passageway 71 which communicates with the passage 70 through radial cross ports 72. Inwardly of the ports 72 the head has dump ports 74 drilled through the full diameter thereof to communicate with passage 70. Plugs 25 and 26 inwardly of ports 74 are each provided with a dump passage 75 which opens into a port 76 leading directly into the open area of the valve chamber 11.

In each head 65 the rear wall 77 of passageway 71 is positioned when in neutral to slightly open the ports 39 and 41 allowing a precharge pressure in lines 17 and 18. Excessive pressure in chambers 69 and 73 will cause the head to close the ports against the force of springs 67.

Operation of the invention will now be explained. As hereinbefore pointed out, the sole function of the valve is to control forward or rearward speed of the vehicle through controlling the fluid pressure in passageways 17 and 18 which pressure in turn regulates the amount of slippage allowed in the reverse and forward transmission slip clutches.

When the control element 22 is moved a slight degree clockwise from the position of FIG. 2, as viewed in FIG. 3, the valve spool 44 will be moved to the right imposing a compressive force upon the spring 67 of unit 64 causing the valve plunger head 65 to move into chamber 73 and open clutch control passageway 71 to the forward clutch inlet port 41. While this will open passageway 18 to fluid pressure to operate the forward clutch, a portion of the fluid will be admitted to chamber 73 through port 72 and passage 70. The pressure in chamber 73 will tend to counteract the compressive force of spring 67 returning the valve plunger 64 toward the left or in a closing direction. As this occurs the pressure in passageway 18 is reduced with resultant forward clutch slippage, slowing movement of the vehicle.

With further clockwise movement of the element 22, the compressive force of spring 67 will again predominate to overcome pressure in chamber 73. Accordingly, the back pressure upon the valve spool 44 and control element 22 increases proportionate to the distance of movement, thus giving the operator a constant feel of the clutch action during the inching operation.

When the element 44 is moved way to the right, the balls 57 and 58 will snap into the detent 54 locking the spool against return movement under force of the centering spring 52. Moreover, in this position the spring 67 has been sufficiently compressed to overcome fluid pressure in the chamber 73. Thus the plunger unit 64 will be held in fully open condition assuring sufficient pressure in passageway 18 to hold the forward clutch fully engaged.

It will be understood that movement of control element 22 in the opposite direction, or to the left as viewed in FIGS. 2 and 3, will serve to operate the reverse clutch in the same manner through passageway 17. During such reverse operation the pressure in chamber 69 will serve to resist opening movement of the reverse valve plunger 63 in the same manner as the pressure in chamber 73 in the operation just described.

The centering spring 52 serves to yieldably retain the valve spool 44 in the centered or neutral position shown in FIG. 2. During opening of the reverse valve plunger unit 63 the spring 52 will be compressed between washers 50 and 51, the former being held by snap ring 49 mounted in the valve housing to return the spool when manual pressure is removed from the control element 22. Conversely, during opening of the forward valve plunger 64, the spring 52 will be compressed between washers 50 and 51 with the former being moved by snap ring 48 mounted on the spool.

An important feature of the valve is the fact that it allows precharging of the outlet passageways 17 and 18 and chambers 69 and 73 enabling immediate clutch response to any movement of the control element 22. This precharging takes place through the control passageways 71 when the valve spool is in neutral position (FIG. 2). The plugs 25 and 26 may be adjusted axially of the valve chamber 11 by turning bolt 32 to adjust the precharge desired in the clutches and the size of the pressure chambers 69 and 73 to overcome the compressive force of springs 67 in the desired manner.

When the valve spool 44 is moved to one side, such as in FIG. 3 to operate the forward clutch, the precharge in the reverse clutch outlet passageway 17 will be lost through outlet port 40, port 72, passage 70, dump port 74, port 76, chamber 11, port 78 in the valve spool, and chamber 20 back to the reservoir. The precharge will be regained, however, as soon as the valve spool is shifted to a neutral position.

The precharge at a relatively low pressure provides immediate response of the forward and reversing clutches to movement of the control element 22 through operation of the control handle 80 (FIG. 1). It also eliminates any so-called stickiness in the hydraulic circuit.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a control valve for selectively actuating the forward and reverse fluid actuated clutches of a truck transmission, a valve housing having an elongated internal chamber adapted to receive fluid under pressure from a suitable source, said housing having forward and reverse outlet passageways opening into the chamber and adapted to be respectively connected to forward and reverse clutches of a transmission, a value means disposed in said chamber for longitudinal sliding movement in the chamber between forward and reverse positions respectively opening said source to said outlet passageways and a central neutral position, a control connected to the valve means for operating the same, and said valve means having control passageways positioned to open both of said outlet passageways to the source when the valve means is in neutral position to precharge the outlet passageways with the fluid.

2. The subject matter of claim 1 in which a spring means is disposed between the housing and valve means to yieldably retain the valve means in neutral position, and detent means acting between the housing and valve means to automatically releasably lock the valve means in said forward or reverse positions when the valve means has been so moved against tension of the spring means.

3. The subject matter of claim 1 wherein the valve housing is provided with pressure chambers at each end of the valve means to act upon the valve means to control the size of said control passageways, and means for adjusting the size of said pressure chambers.

4. In a control valve for selectively actuating forward and reverse clutches of a truck transmission to provide inching movement of the truck in either direction, a valve housing having an elongated valve chamber and a fluid inlet passageway and forward and reverse fluid outlet passageways, the housing having internal passageways connecting the inlet passageway respectively to the forward fluid passageway through a forward inlet port at one end portion of the chamber and to the reverse passageway through a reverse inlet port at the opposite end portion of the chamber, an elongated valve spool disposed in the central portion of the chamber for longitudinal sliding movement, a pair of plunger elements extending one from each end of the spool and slidably associated therewith, each element having a piston head normally substantially closing the inlet port at the adjacent end of the chamber, a pressure chamber at each end of the valve chamber having an open connection with the adjacent inlet port and exposed to the adjacent piston head to urge the plunger inwardly toward the spool, spring means acting between the spool and each plunger element to yieldably resist said inward movement of the plunger, and a control connected to the spool for selectively moving the spool in either direction.

5. In a control valve, a housing having an inlet for receiving fluid under pressure, and forward and reverse clutch outlet passageways adapted for respective connection with the forward and reverse clutches of a vehicle transmission, said housing having an elongated valve chamber in open connection with said inlet and said forward and reverse clutch outlet passageways, a valve spool disposed for axial sliding movement in the chamber in either direction from a central position, control means for sliding the valve spool, and a plunger element slidably associated with each end of the spool, each plunger element serving as a closure valve between the inlet and one of the clutch outlet passageways, and counteracting pressure means within the chamber acting axially inwardly and outwardly directly upon each plunger element to balance the element in its near closure position when the spool is in its central position, the inwardly acting pressure means on each element adapted to increase as the plunger element is moved theretoward with the valve spool.

6. In a control valve, a housing having an inlet for receiving fluid under pressure and first and second outlet passageways for discharging said fluid therefrom, said housing having a single elongated valve chamber in open communication with said inlet and passageways, an elongated valve means disposed for axial sliding movement in the chamber in either direction from a central position, control means connected to the valve means for selectively sliding the valve means between different axial positions within the chamber, said valve means including first and second passageway closure pistons positioned so that when the valve means is moved in one direction from the central position the first piston will close between the inlet and the first outlet passageway and the second piston will open the inlet to the second outlet passageway and when the valve means is moved in the opposite direction from the central position the first piston will open the inlet to the first outlet passageway and the second piston will close between the inlet and the second outlet passageway and when the valve means is in the central position said first and second pistons will respectively partially close between the inlet and first outlet passageway and inlet and second outlet passageway.

7. The subject matter of claim 6 wherein a spring means is disposed between the housing and valve means to yieldably retain the valve means in the central position against said axial movement.

References Cited by the Examiner
UNITED STATES PATENTS

| | | | |
|---|---|---|---|
| 2,301,099 | 11/1942 | Upp | 192—87 X |
| 2,329,742 | 9/1943 | Bush et al. | |
| 2,725,890 | 11/1955 | Kanuch. | |
| 2,814,371 | 11/1957 | Bolster | 192—134 |
| 3,059,746 | 10/1962 | Christenson | 192—87 |
| 3,095,760 | 7/1963 | Christenson et al. | 192—87 X |

DAVID J. WILLIAMOWSKY, *Primary Examiner.*

DON A. WAITE, *Examiner.*

B. W. WYCHE, *Assistant Examiner.*

UNITED STATES PATENT OFFICE
CERTIFICATE OF CORRECTION

Patent No. 3,243,025                                  March 29, 1966

Donald C. Staab et al.

It is hereby certified that error appears in the above numbered patent requiring correction and that the said Letters Patent should read as corrected below.

In the heading to the printed specification, lines 6 and 7, for "Minnesota" read -- Delaware --; column 5, line 40, for "value" read -- valve --.

Signed and sealed this 24th day of January 1967.

(SEAL)
Attest:

ERNEST W. SWIDER                                EDWARD J. BRENNER
Attesting Officer                                   Commissioner of Patents